United States Patent [19]

Caplan et al.

[11] Patent Number: 5,175,728
[45] Date of Patent: Dec. 29, 1992

[54] FLEXIBLE INTERFACE SYSTEM FOR INTERFACING DIFFERENT COMPLEMENTS OF PORT CIRCUITS FOR A PCM TELEPHONY SWITCHING SYSTEM

[76] Inventors: Jerome S. Caplan, 7 Round Hill Rd., Henrietta, N.Y. 14467; Paul A. Buchiere, 236 Dartmouth St., Rochester, N.Y. 14607; Elaine M. Kazimir, 83 West Ave., Apt. #3, Fairport, N.Y. 14450

[21] Appl. No.: 725,133

[22] Filed: Jul. 3, 1991

[51] Int. Cl.⁵ .............................................. H04Q 11/04
[52] U.S. Cl. .................................. 370/58.2; 370/68.1; 370/110.1
[58] Field of Search ....................... 370/56, 58.1, 58.2, 370/58.3, 61, 62, 66, 68, 68.1, 79, 110.1, 67, 85.1; 379/93, 94, 9, 10, 15, 202, 242, 253, 269, 284, 286

[56] References Cited

U.S. PATENT DOCUMENTS

| | | | |
|---|---|---|---|
| 3,761,637 | 9/1973 | Henrion | 370/58.2 |
| 4,228,536 | 10/1980 | Gueldenpfennig et al. | 370/68 |
| 4,377,859 | 3/1983 | Dunning et al. | 370/58.2 |
| 4,523,308 | 6/1985 | Bull et al. | 370/58.2 |
| 4,597,074 | 6/1986 | Demichelis et al. | 370/58.2 |
| 4,805,172 | 2/1989 | Barbe et al. | 370/68.1 |

Primary Examiner—Douglas W. Olms
Assistant Examiner—Alpus H. Hsu

[57] ABSTRACT

An interface system for port circuits of a distributed PCM telephony switching system enables different complements of port circuits (different numbers of line circuits or of trunk circuits or of digital circuits which handle multiple party conferences) to be connected into the PCM telephony switching system so as to meet different user requirements. The interface system handles the PCM data signals carrying voice (analog) and digital information. The interface system also handles control signals generated in the telephony processor and transfers the data between the port circuits and the highways of the PCM switching system in sequential time slots. The timing of the time slots, the allocation of the time slots to different data is selectable by manually, configurable, programmable, switching devices which set up codes and connections corresponding to the complement of port circuits which are to be interfaced with the PCM telephony switching system. These switching devices are implemented by programmable headers having conductive elements which may be left intact or severed. The same interface circuitry, but with different connections intact and severed in their programmable headers, is used to establish the timing and allocate time slots in accordance with the configuration of port circuits selected by the user of the telephony system, thereby opening the architecture of the telephony system to different port circuit arrangements while isolating the telephony system from the port circuits for safety and security of operation of the telephony system.

11 Claims, 8 Drawing Sheets

FLEXIBLE INTERFACE SYSTEM FOR INTERFACING DIFFERENT COMPLEMENTS OF PORT CIRCUITS FOR A PCM TELEPHONY SWITCHING SYSTEM

BACKGROUND OF THE INVENTION

1. Field of the Invention

The present invention relates to PCM telephony systems and more Particularly to an interface system for enabling different complements of port circuits, selected by the user, to be interfaced with the PCM telephony system for providing greater flexibility in the design of PCM telephony systems to satisfy different user applications.

2. Description of the Related Art

The present invention is especially suitable for providing a flexible interface system for interfacing different complements of port circuits to a PCM telephony switching system such as described in U.S. Pat. No. 4,228,536 issued Oct. 14, 1980 to K. Gueldenpfennig and C. J. Breidenstein and assigned to Redcom Laboratories, Inc. This is a distributed PCM time division digital switching system. The interface system of the invention is also especially suitable for use in telephone switching systems in port boards and port circuits of PCM time division multiplex switching systems such as described in U.S. Pat. No. 4,805,172 issued Feb. 14, 1989 to C. A. Barbe and B. G. Littlefield and assigned to Redcom Laboratories, Inc. for enabling the user of the system to configure the port circuits or port boards of the switching system to provide different applications including connections of data representative of voice signals to N lines or trunks where N is limited only by the number of time slots available to the port circuit and to provide connections for data representing digital communication data signals, such as used in conferencing.

In PCM telephony, data representing different signals is multiplexed in sequential time slots along PCM highways. These highways are connected to port circuits which contain coding and decoding devices for changing analog (e.g., voice) signals into pulse codes and vice versa, digital communication signal handling devices, and even video signal handling devices, all of which require different complements and/or numbers of sequential time slots. Accordingly, port circuits have been designed specifically for different applications and telephony switching systems which have heretofore been provided, such as shown and described in the above-referenced patents, have port circuits or port boards which are dedicated to specific applications (i.e., different combinations of line or trunk circuits and/or digital communication signal handling circuits). Users of telephony systems oftentimes require differently configured port circuits to meet their applications. Some users may wish to design their own port circuits. It is desirable to provide the flexibility for differently configured port circuits and to enable users to design their own circuits. However, the telephony switching system architecture, if opened to various port circuit designs and configurations, renders the system vulnerable to damage by the user configured port circuits and may violate security by exposing calls which may contain private information and/or programming codes of a secret nature.

SUMMARY OF THE INVENTION

It is the principal object of the present invention to provide an improved interface system for PCM telephony (time division multiplex) switching systems which provides the flexibility of enabling use of different complements of port circuits (lines, trunks, digital communications—conferencing utilities) without undue risk of damage to the telephony switching system or exposure of secure data and programs stored in the system.

It is another object of the present invention to provide an improved, flexible interface system which interconnects the highways and control lines of the PCM telephony system with the highways and control/status lines of different selected configurations of port circuits which utilize different numbers or arrangements of the sequential time slots which carry the data signals representing information on the highways of the switching system.

It is a further object of the present invention to provide an improved flexible interface system for integrating different complements of port circuits with a PCM telephony switching system, which port circuits may be selected or designed by the user of the telephony switching system in accordance with the user's application.

Briefly described, an interface system for a PCM telephony switching system, in accordance with the invention, interfaces PCM data send and receive highways of the switching system with a port circuit also having a send and a receive highway, and enables that port circuit to be selected from a plurality of different types of port circuits which are configured to provide different applications. Such applications may include connections for data representing voice signals to N lines or trunks where N may be different depending upon the application and to provide connections for data representing digital communication data signals, such as for conferencing applications. The interface system utilizes means for transferring data on the send highways of the switching system on which the data propagates in successive time slots to the receive highway of the selected port circuit, and from the send highway of the selected port circuit to the switching system. This transmission may be via another send highway comprised of a sequential group of these time slots. This data transferring means is operated and controlled by means responsive to the control signals from the switching system, thus enabling the allotment of a sequential group of time slots required by the configuration of the port circuit. The control signals from the port circuit which indicate the status thereof (i.e., off hook, busy, etc.) is also transferred back to the switching system bi-directionally on lines which carry the control signals. In order to condition the control means and the transferring means to allot different numbers of time slots in different time relationships in accordance with the type of the port circuit which is being interfaced, manually programmable connection means are used. These connection means provide different connections which are selectable by the user corresponding to different ones of the port circuit applications. Thus, a sequence of successive time slots is made available to the port circuit in accordance with its configuration.

BRIEF DESCRIPTION OF THE DRAWINGS

The foregoing and other objects, features and advantages of the invention, as well as a presently preferred embodiment thereof, will become more apparent from a reading of the following description in connection with the accompanying drawings in which:

FIGS. 4 and 5 connected together as shown in FIG. 6 are a block diagram of the portion of the system constituted substantially of those circuits which handle the transference of digital data in allotted time slots;

DESCRIPTION OF THE PREFERRED EMBODIMENTS

Figures 1, 3:
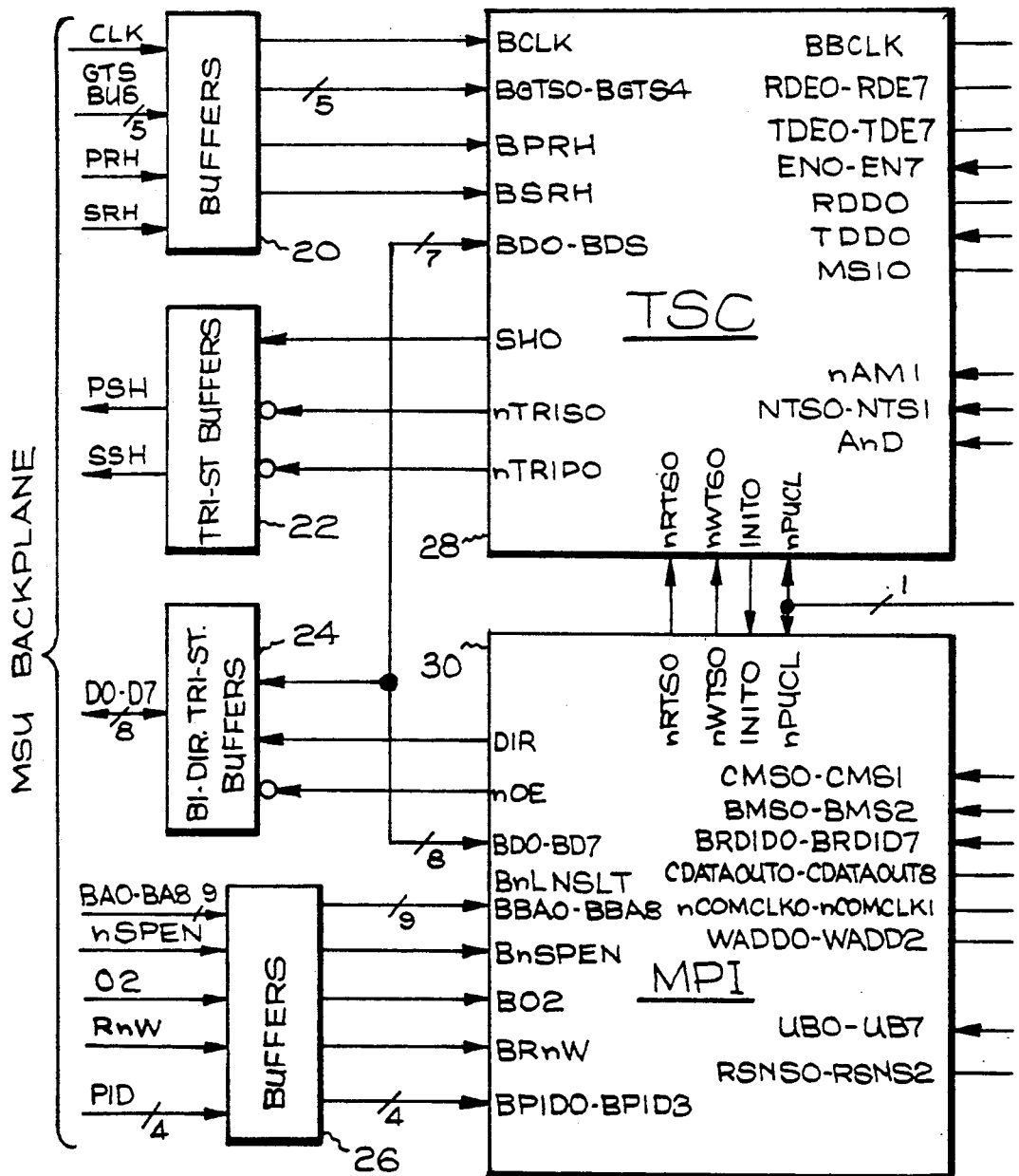
FIGS. 1 and 2 connected together as shown in FIG. 3 is a block diagram of a flexible interface system in accordance with an embodiment of the invention.

Referring to FIG. 1, there is shown a flexible interface system which may be mounted on a printed circuit board with contacts which are received in a connector on a backplane printed circuit board, which interconnects other printed circuit boards carrying circuits including memory devices, processors which are described in the above-referenced patents. The lines on the backplane board are the clock (CLK) line, the gray code time slot bus (GTS BUS) of five lines, the port receive highway (PRH), the service receive highway (SRH) which are the lines which carry the PCM data signals to the port circuit. Also on the backplane are the port send highway (PSH) and the service send highway (SSH). These are the highways which carry PCM data from the port circuit into the switching system. The backplane has eight data lines (D0-D7) and nine address lines (BA0-BA8). There is another address line on the backplane (nSPEN)—not service port enable—which distinguishes whether access to port and service circuits is required by the PCM telephony switching system. Another line carries the processor clock or Phase II clock. Another line on the backplane which is connected to the port circuits is the read not write (RnW) line. Four lines are provided for port identification (PID) which identifies the position of the port circuit within the telephony system and enables it to be addressed by the processor of the PCM telephony switching system.

These lines from the backplane are connected to buffers which isolate the port circuit from the telephony switching system. Buffers 20 carry the CLK, GTS BUS, PRH and SRH lines into the interface. Tri-state buffers 22 are selectively enabled to output data on the PSH and SSH lines. A set of bi-directional tri-stateable buffers 24 buffer the data lines and interconnect them bi-directionally to the interface system. Another group of buffers 26 connect the address lines, Phase 2 clock, RnW and PID lines to the interface system.

Similar nomenclature is used to identify the input signals into a first circuit which is a time slot control TSC circuit 28, which controls the transfer of data between the user'sport circuitry and a second circuit which is a modular switching unit port interface (MPI) circuit 30 which handles the control signals and also controls/the operation of the transferring circuits 28. The inputs from the buffers 20, 22, 24 and 26 to these circuits 28 and 30 are identified by the same nomenclature as inputs to the buffers with the letter "B" as a prefix to indicate that the signals are buffered. These circuits 28 and 30 are field programmable gate arrays which are shown in greater detail hereinafter in connection with FIGS. 4 and 5 and FIG. 7. The outputs from these gate arrays go to the user circuitry either directly or through command latch circuitry 32. The system is reset on power up and when power is less than a safe operating level by a power monitor/PUCL (power up clear) circuit 34.

The allocation of timing and time slots so as to flexibly interface the user circuitry with the PCM switching system in operation of the transfer and control circuits 28 and 30 is accomplished by switch means in the form of programmable headers and associated circuitry 36. These programmable headers are devices having conductive links which can be selectively cut so as to provide open or closed connections. Each link may be associated with circuits which apply logic ground or logic high voltages to the circuits 28 and 30. These combinations of logic high and ground voltages constitute codes which condition the transferring and control circuits 28 and 30 to allocate time slots sufficient in number to handle the transfer of data on the highways between the telephone switching system and the user circuitry.

Figure 2:
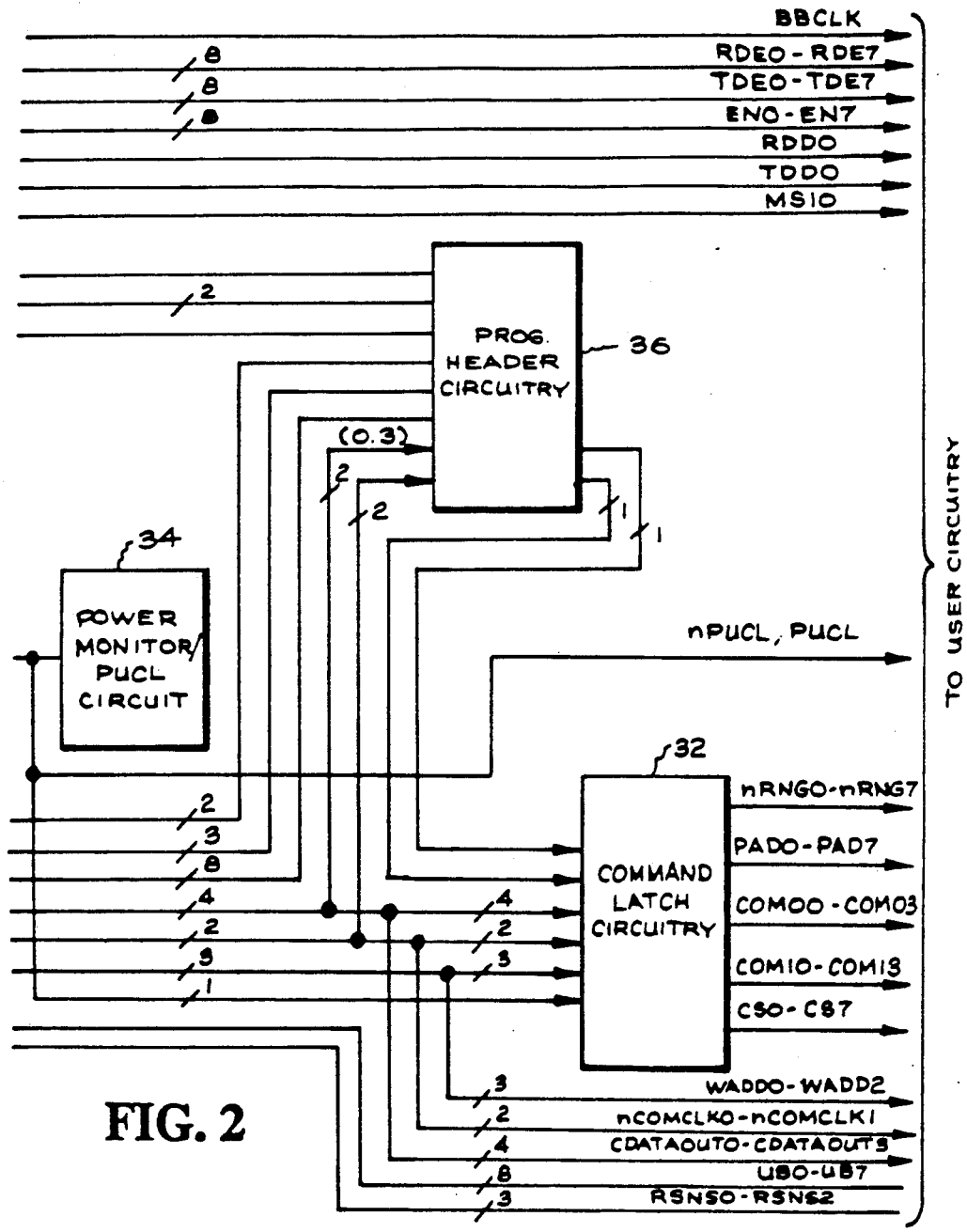

Identification of components by type number which may be used in providing the circuits shown in FIGS. 1 and 2 are indicated on the Figure. For example, the buffers 20 and 26 may be type 74ALS244 chips which are commercially available from various sources by this type number.

The connections to the switching system are indicated as being connections to the MSU backplane. MSU stands for modular switching unit and is the switching system described in the above-referenced Gueldenpfennig and Breidenstein patent. The service and port highways are utilized in such a switching system and are fully described in the above-referenced Gueldenpfennig and Breidenstein patent. The Gueldenpfennig and Breidenstein patent also discusses port circuits. These port circuits may contain codecs (coder/decoder devices) which translate digital signals carried on the highways into analog signals (such as voice signals) and analog signals into signals which are applied in allocated time slots to the highways. The circuits 28 are referred as to the TSC (time slot control) circuit. The control signal handling circuits 30 are referred as to MPI, an acronym for MSU port interface. These circuits are configured from field programmable gate arrays. These gate arrays are programmed in accordance with conventional techniques to provide the circuits shown in FIGS. 4 and 5 in the case of the TSC and in FIG. 7 in the case of the MPI.

Figure 8:
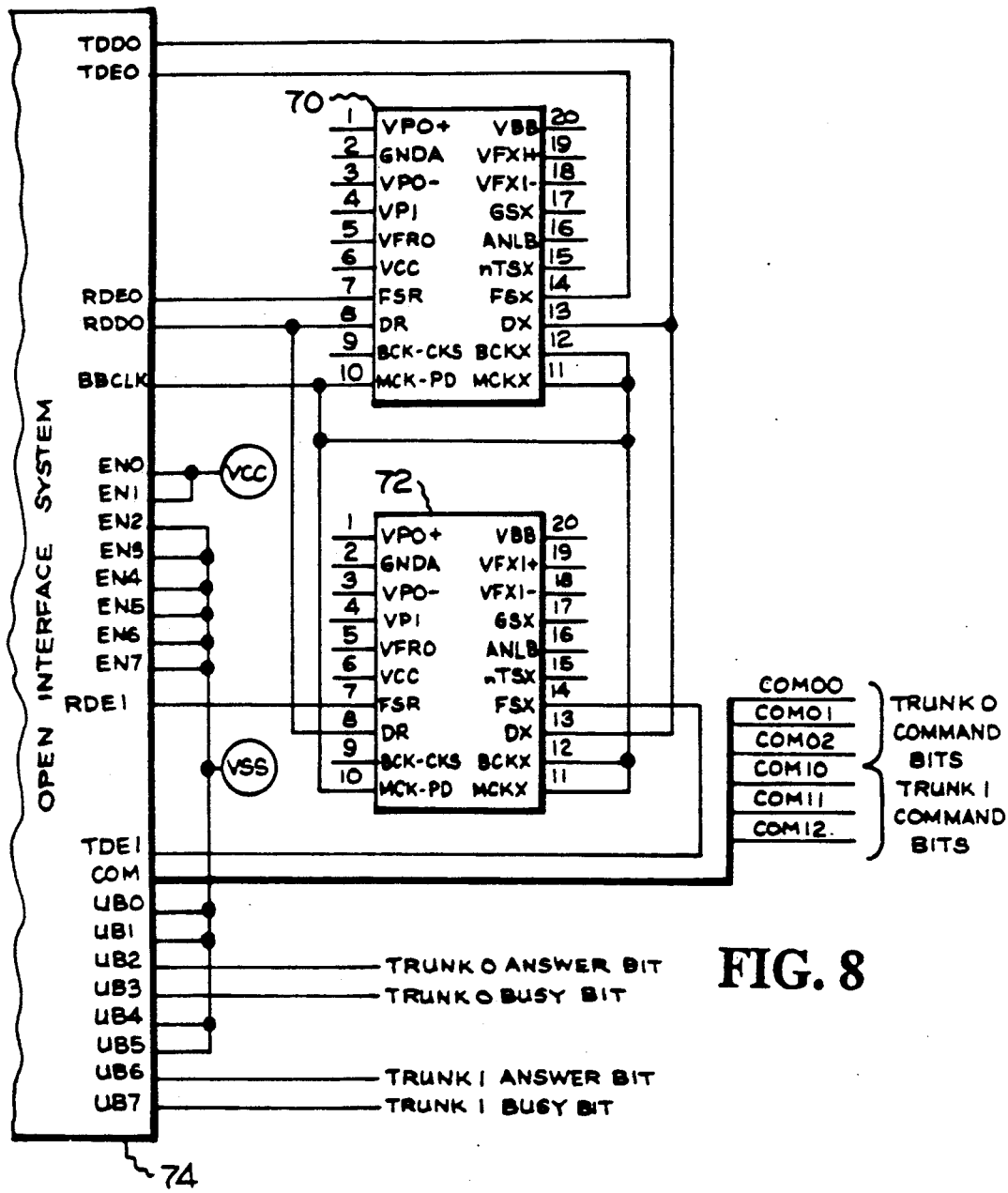
FIG. 8 is a block diagram of a port circuit for typical two-party trunk application, showing connections from the user's circuits to the interface system provided by the present invention.

These gate arrays provide the outputs to the user circuitry which are indicated by the acronyms shown adjacent to the lines identified as going to user circuitry. These acronyms and the functions of these lines will be discussed below. The interface system as shown in FIGS. 1 and 2, including all of its circuits, may be mounted on one portion (near the connections to the MSU backplane) of a printed circuit board. The other portion of the board may have mounted thereon the codecs and other port circuits of the type designed for the user's application and connections thereto. These applications, for example, may be 2, 4 or 8 party analog (line circuit or trunk) operation or 2, 4, 8 and 16 party digital communications such as conferencing. FIG. 8 shows a typical user circuit for a two-party trunk application.

For each of these applications, the timing and allocation and number of sequential time slots which come in and go out on the PCM highways is differently configured. Such configuration is provided with the programmable header and associated circuitry 36. The programmable header and associated circuitry provides flexibility in enabling any of the foregoing complement of port circuit types to be interfaced with the PCM telephony switching system.

The output lines, which are conductors on the printed circuit board which are connected to the user port circuitry in the interface system shown in FIGS. 1 and 2, are the PCM clock which is buffered and transferred through the TSC circuit 28. It is called the BBCLK and in the MSU switching system is a 2.048 MHZ PCM clock. There are seven PCM received data enable lines, each of which denotes the start of a received time slot and extend for the duration thereof. These lines are indicated as RDE0 to RDE7. The TDE0 through TDE7 lines are the PCM transmit data enable lines which denote the transmit time slots. Input lines to the TSC which control the RDE outputs are EN0 to EN7. The data highways to and from the ports are the receive digital data (RDD0) and the transmit digital data (TDD0) lines, respectively.

Figure 10:
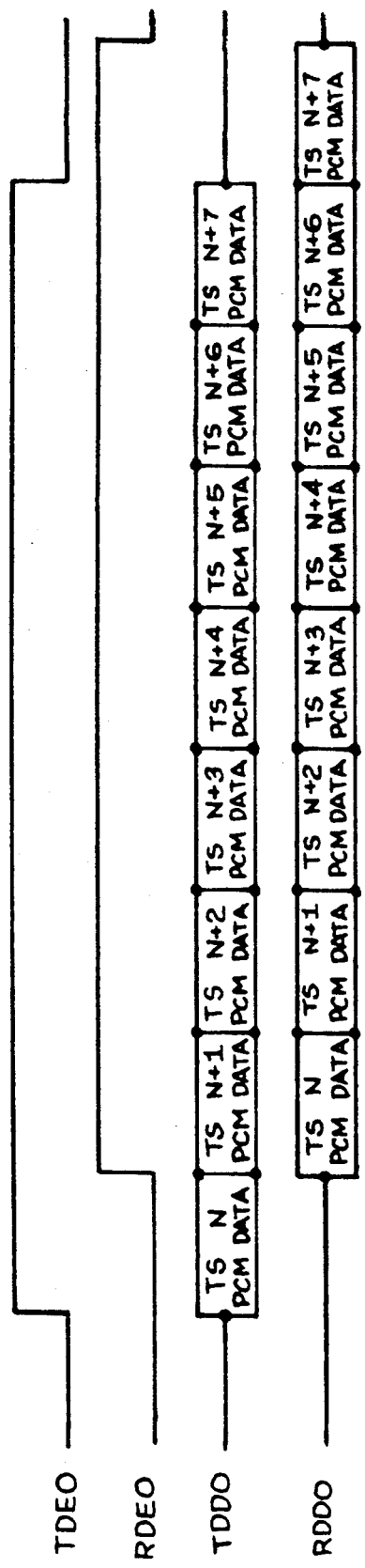
FIGS. 10 and 11 are timing diagrams showing the signals which are generated in accordance with the allocation of time slots for an 8 circuit digital conference application and for a 16 circuit digital conference application, respectively.
Figure 11:
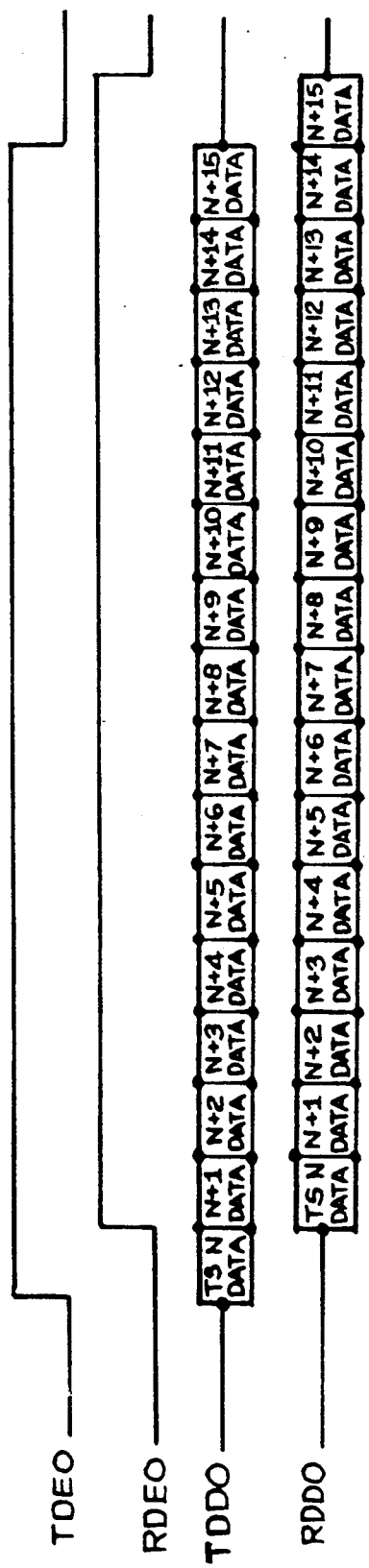

The signals occurring on the TDE0, RDE0, TDD0 and RDD0 for the 8 circuit digital conference application and the 16 circuit digital conference application are shown in FIGS. 10 and 11. The typical two circuit analog trunk application uses signals on the TDE1 and RDE1 lines to set up the allocation of the time slots for a two circuit trunk which is shown in FIG. 8. The generation of these signals and the timing thereof will become more apparent as the description proceeds.

The outputs from the power monitor circuit, nPUCL and PUCL are made available to the user circuitry on two lines.

The MPI circuit receives and transmits control signals on a number of lines. These are the write register address lines WADD0 to WADD2 which address the registers in the user circuits. Two clocks control the use of this address data, since it arrives in four bits on data output lines CDATAOUT0 to CDATAOUT3. The data is multiplexed so as to use fewer pins on the gate array. This command data is also latched in the command latch circuitry 32 and used for control of various user port circuits. For example, command bits which control ringing voltage are latched and provided on eight output lines nRNG0 to nRNG7. The control lines also control the pads (the amount of attenuation) inserted in series with the codecs. These command bits are used as pad control bits PAD0 to PAD7. These control bits may serve up to eight codecs in the user's circuitry. The ringing lines may serve up to eight ringing circuits in eight analog user port circuits. Control bits COM00 to COM03 and COM10 to COM13 command the operation of trunks. Control bits CS0 to CS7 may be used to select conference configurations.

The user status from registers in the port circuit appear on the user buffer lines UB0 to UB7. These lines contain data as to off hook, answer status and busy status data on the UB lines which is asserted from the user circuit and applied via the MPI circuit 30 to the data lines of the MSU backplane in different addresses in the memory of the MSU processor. In order to increase the capacity and to input greater amounts of status data which may be contained in the registers of the port circuit, RSNS0 to RSNS2 (read sense register address lines) may be used to address registers external to the MPI so that the data stored in any of eight external address registers can be read out and asserted on the data lines D0 to D7.

Several lines are shared between the TSC circuit 28 and the MPI circuit 30. These are strobes NRTS0 (not read time slot) and NWTS0 (not write time slot). These are timing pulses which indicate valid data transfer between the TSC and the MSU, and depend upon the control signals and the codes from the programmable header circuitry 36. The initialization bit is read from the time slot register in the TSC circuit 28 and then transmitted through the MPI circuit 30 on the data lines to denote when the time slot register has been written to. The power up clear (nPUCL) clears the registers in the TSC circuit 28 and MPI circuit 30. The command latches are also cleared by the PUCL pulse.

In operation, all signals between the MSU, the TSC circuit 28 and the MPI circuit 30 are buffered in the buffers 20 to 26, thereby isolating the user circuitry from the MSU and preventing any signals on the backplane from damaging the interface or the user port circuits connected thereto. The send highways, PSH or SSH are selected by enabling buffers in the tri-state buffer 22 which connect the send highway output (SHO) of the TSC circuit 28 to the selected (port or service) send highway. The data is sent in the allocated time slots from the TDD0 input into the TSC from the user circuitry. Alternate bits may be inverted to satisfy Mu or A law companding requirements of the telephony system by an nAMI input from the programmable header circuitry. The number of time slots is also selected by a code from the programmable header circuitry 36 on three lines NTS0, NTS1 and AND. These lines enable the selection of eight different port circuit configurations requiring 2, 4, 8 or 16 time slots. In the analog or voice mode with these codes, 2, 4 and 8 party line or trunk circuits can be selected and in the digital mode, circuits for 2, 4, 8 and 16 party operation can be selected. This selection is made in the MPI BMS0 to BMS2 lines on which codes are set up in the programmable headers 36. The programmable header also sets up codes on CMS0 and CMS1 lines, which also are mode select lines, and indicate the number of port circuits on the board. There are two CMS lines which can either be logic high or logic low and can denote 2 circuit, 4 circuit, 8 circuit or 16 circuit user configurations which are interfaced by the illustrative system illustrated in the drawings.

Another output is provided by the TSC circuit 28 in response to the highest order bit of the gray code. This is MSI0 (master sync) which is used in some codecs requiring synchronization information, and is made available for the user when the user employs such codecs.

The transfer of data from the MSU data lines to the TSC circuit 28 and MPI circuit 30 is controlled by the nOE (not output enable) and the DIR (data direction) signals. The DIR is a buffered version of the RnW which is transferred through the MPI circuit 30. The nOE indicates when data is to be transferred between the MPI and the MSU backplane. The buffers 24 which carry the data are tri-stated when not in use by the nOE output from the MPI circuit 30.

In operation, the PCM data is transferred via the TSC in time slots allocated by the MSU and the particular application codes developed in the programmable header circuitry 36. The timing and numbers of time slots allocated is determined in the TSC as will be explained more fully in connection with FIGS. 4 and 5. Thus, groups of sequential time slots as required by the complement of user circuitry connected to the interface are allocated, thereby maintaining security since the user circuitry is isolated from the backplane by the MPI circuit 30, the TSC and the buffers 20 to 26.

Figure 4:
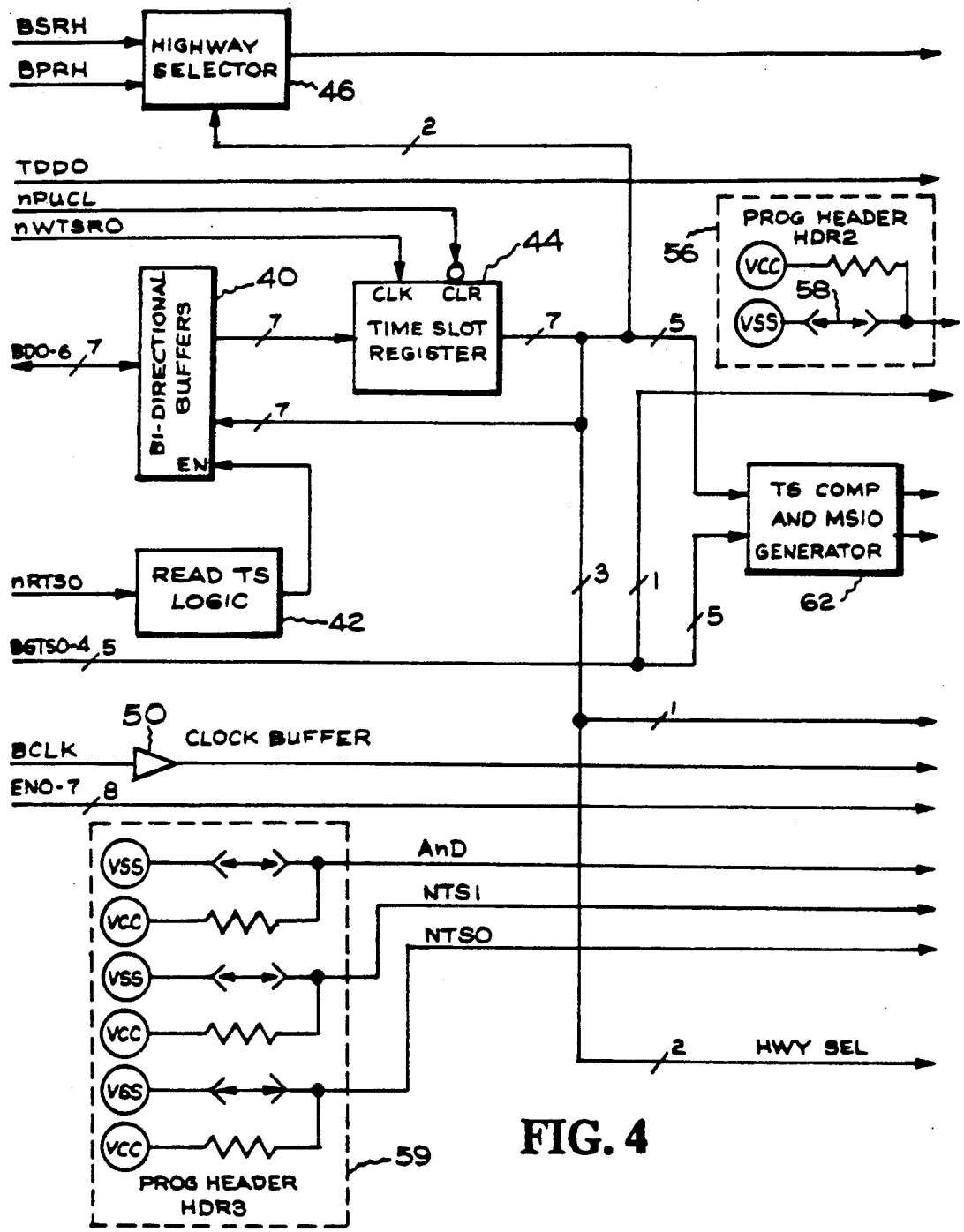
Figure 6:
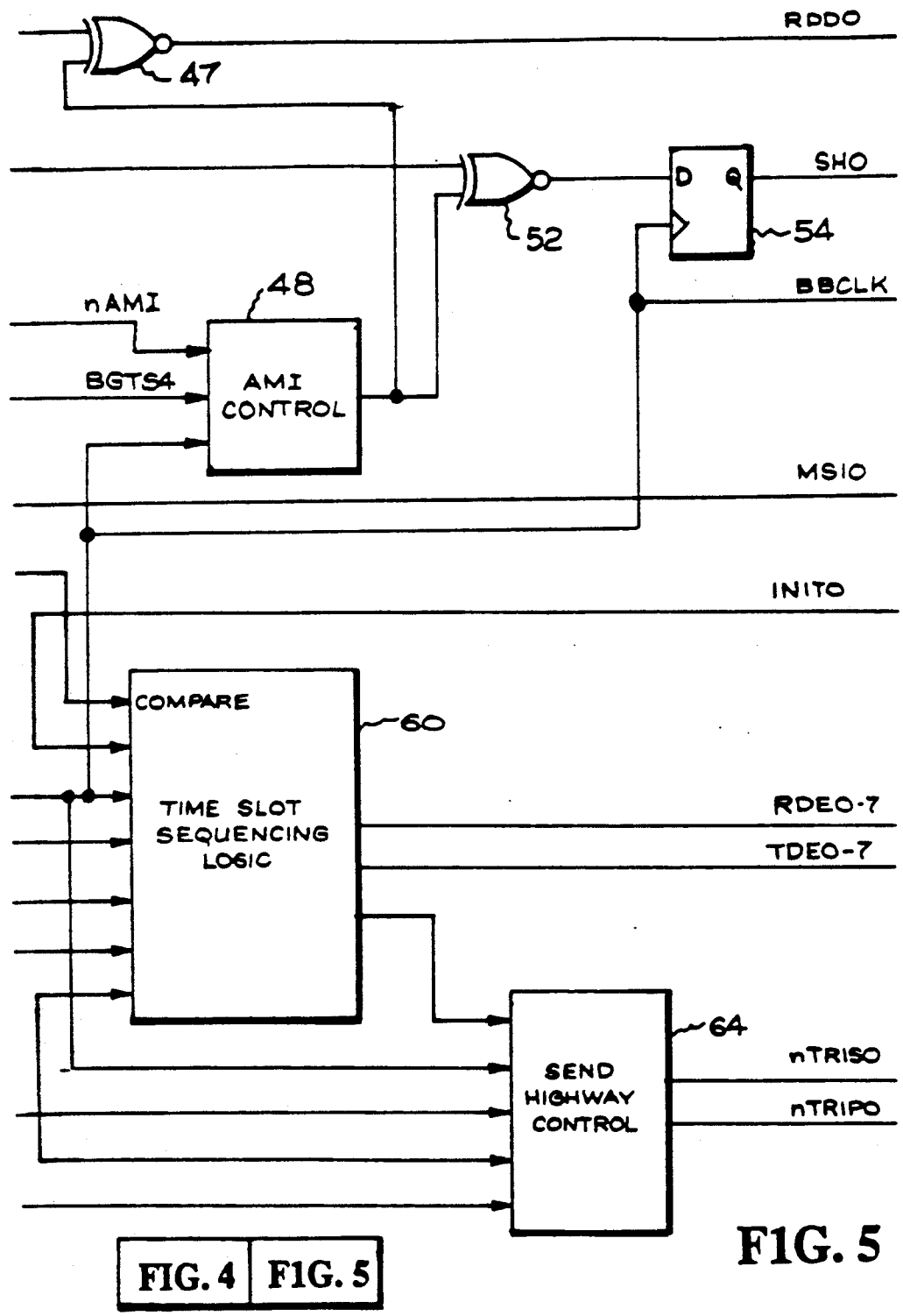

Referring to FIGS. 4 and 5, the TSC circuit 28 has internally through the configuration of the gates in the gate array, bi-directional buffers 40 which connect to the data lines BD0 to BD6. These buffers are enabled so that the time slot data can be read by the read time slot logic 42. The time slot assignment is stored in a time slot register 44. This register is cleared on power up by nPUCL and written to when the write strobe nWTSR0 occurs. Two bits of the time slot register data select the port or send receive highways in a highway selector multiplexer 46. PCM data from the receive highway appears on the receive highway of the port circuit RDD0 through an Exclusive Or gate for alternate mark inversion. This gate can be enabled to mark and invert alternate bits of the PCM data when the programmable header enables AMI control logic 48. The inversion pulses to the Exclusive Or gate 47 are controlled by the PCM clock, which enters the TSC as the BCLK and is buffered by a clock buffer 50 therein. The AMI control is also operative on the transmit digital data TDD0 from the user circuitry which is output on the send highway output (SHO) line through an Exclusive Or gate 52 which is operative when the programmable header asserts the nAMI signal on the AMI control 48. The bits of the digital data from the user circuitry are reclocked by a flip flop 54 before being passed on to the SHO output.

The generation of a control code in the programmable header circuitry is illustrated by the programmable header circuitry 56 which generates nAMI. The programmable header is a link 58 which is shown solid, but which can be cut. This link may extend between two pins on a dual in-line package (DIP). Such header packages are commercially available. To one pin, VSS or logic low voltage is applied, while to the other pin, VCC or logic high voltage is applied via a resistor, for example of 10 KOhms. Then if link 58 is intact, low logic level is asserted as nAMI. If the link 58 is cut, VCC appears at the nAMI output and a high logic level is asserted.

The programmable header (HDR3) shown at 59 provides the codes for the AnD and NTS1 and NTS0 lines. The gate array therefore provides the capability of PCM control for 2, 4, 8 and 16 time slot (party) port circuits.

The number of time slots that is allotted for the interface circuit is dependent on the NTS code which selects either 2, 4, 8 or 16 time slots. The number of time slots assigned is also dependent on the AnD code. When in the analog or voice mode, 2, 4 and 8 party operation may be selected. In a digital mode, 2, 4, 8 and 16 party operation is selected dependent upon AnD.

The TSC time slot register 44 is written to when nWTS0 (not write time slot) input is strobed low. To read the contents of the register 44, the nRTS0 (not read time slot) input is strobed low. Data will then appear on the data bus BD0 to BD6. The time slot register 44 holds 8 bits of information. The five least significant bits represent the gray code starting time slot. The two next bits represent the highway assigned (service or port). The most significant bit of the time slot register is the INIT bit. When the time slot register is initialized, (i.e., has a time slot and a highway assignment written to it) the INIT bit goes high. The register 44 may be written into or read from via the bi-directional buffers 40. The INIT bit is outputted to the MPI and is internally multiplexed on to the data bus with other information, namely the status data on UB0 to UB7 and board identification data (BRDID0 to BRDID7)—See also FIG. 7—which are established by the programmable header circuitry 36. The INIT bit and these other codes (UB0 to UB7 and BRDID0 to BRDID7 are multiplexed out on to the data lines back into the MSU for use in identifying the port circuit configuration, status of the port circuits and to indicate that a time slot has been allocated for PCM data, thereby providing assurance that there is data allocated for that port circuit available to be accessed by the telephony switching system (the MSU).

The RDE0 to RDE7 and TDE0 to TDE7 signals are generated by time slot sequencing logic 60 which is operated by a compare and pulse generator 62 when enabled by the enable code from the user on the enable lines (EN0-7) and the number of time slots (NTS) and analog not digital (AND) codes from the header 58. The comparator 62 compares the contents of the time slot register against the five bit gray code time slot bus BGTS0 to BGTS4. When the code in the register 44 matches the gray code time slot bus, a compare signal is generated. The time slot sequencing logic then generates the RDE0-7 and TDE0-7 enable signals during the appropriate time slots. The sequencing logic also enables the send highway control logic 64. The nTRISO or nTRIPO are generated to enable the tri-state buffers 22 (FIG. 1) so as to output the data on either the port or service send highway. Transmission of the time slot code back to the MSU backplane is initiated by nRTSO which enables the buffers 40 to read out the seven least significant bits stored in the time slot register 44 onto the data lines BD0-6.

Figure 9:
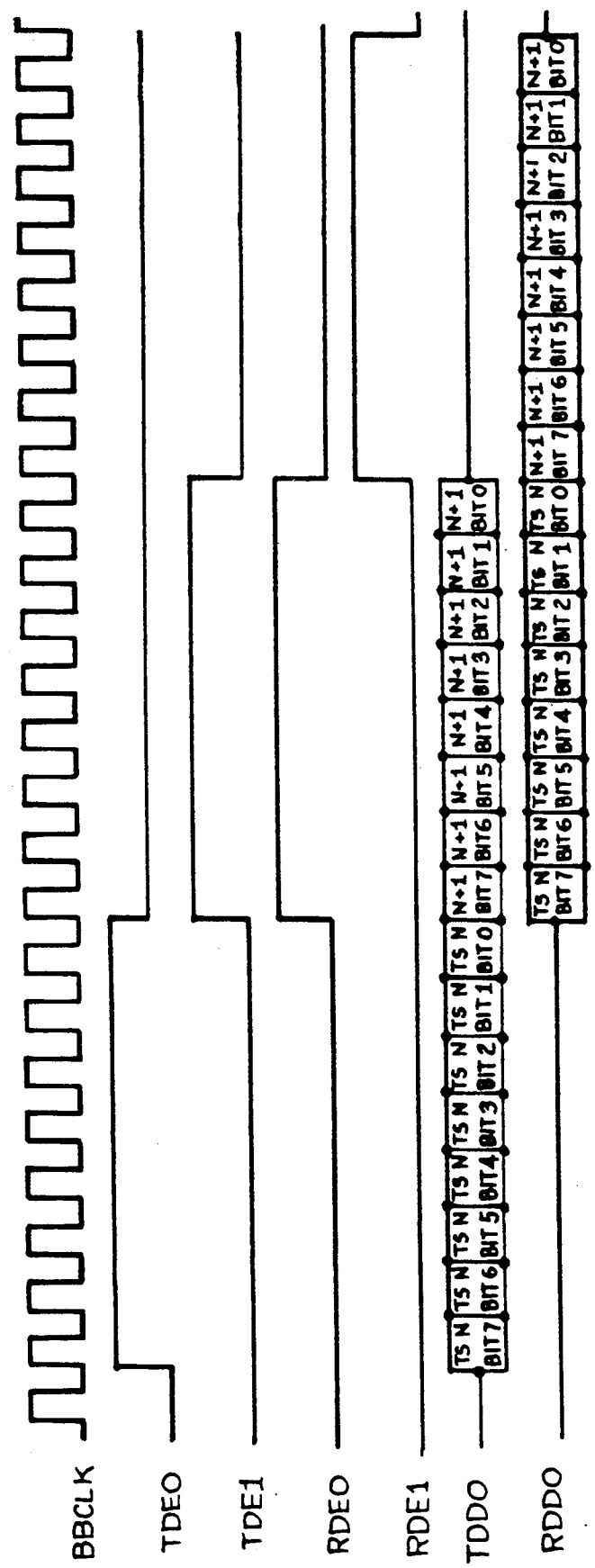
FIG. 9 is a timing chart illustrating timing signals, signals which are generated in accordance with the allocation of time slots and the PCM signals transmitted during the time slots onto a selected highway of the PCM telephony switching system for the two circuit trunk application shown in FIG. 8.

An example of the timing for the two circuit analog trunk application is shown in FIG. 9. There are two sets of signals TDE0 and TDE1 and RDE0 and RDE1 which are generated by the time slot sequencing logic 60. The TDE signals going high indicate that the device connected to the interface (for example, one of the codec 70 and 72 shown in FIG. 8) shall begin to transmit data on the TDDO input from the user's circuitry. This TDD0 input is shown entering the block 74 indicating the user circuitry output lines which are used for the two-party trunk application. TDE0 goes high so as to allocate the first time slot (TS N) for the 8 PCM bits outputted by one of the codecs 70. When the TDE1 line goes high, it enables the outputs of the next time slot (TS N+1) for the next 8 bits from the other codec. Thus, the codecs are alternately enabled to transmit.

The RDE0 and RDE1 outputs to the user circuitry, namely the two different codecs 70 and 72 are enabled to receive 8 bits of data in time slot N and 8 bits of data in time slot N+1. This data is then converted into analog signals and goes out on the trunks (Trunk 0 and Trunk 1) in accordance with the status signals which arrive on the UB lines which are used (UB2, 3 and 6 and 7) in response to the command bits CM00, 01, 02, 10, 11 and 12. The additional circuitry which is connected to the other pins of the codec, for example, for handling analog input and output signals, is not shown to simplify the illustration of the two-party trunk application. FIG. 8 also shows how the enable lines EN0 and EN1 are set logic high while the other enable lines EN2 to EN7 are set at logic low thereby indicating that a two-party application is presented to the interface system by the user's circuitry.

When an eight-party digital conference is provided, the AnD line is set high so that TDE0 and RDE0 are maintained high for 8 time slots. Similarly, when 16 line timing is needed, RDE0 and TDE0 are maintained high for 16 time slots. The time slot sequencing logic makes this selection when enabled by the compare output of the time slot comparator and the code presented by AnD, NTS1 and NTS0 inputs to the sequencing logic 60. The time slot sequencing logic outputs on each data clock so as to maintain the enable signals on the TDE0 and RDE0 lines during the time slots called for by the time slot register, the enable (EN) codes and the AnD, NTS1 and NTS0 code.

Figure 7:
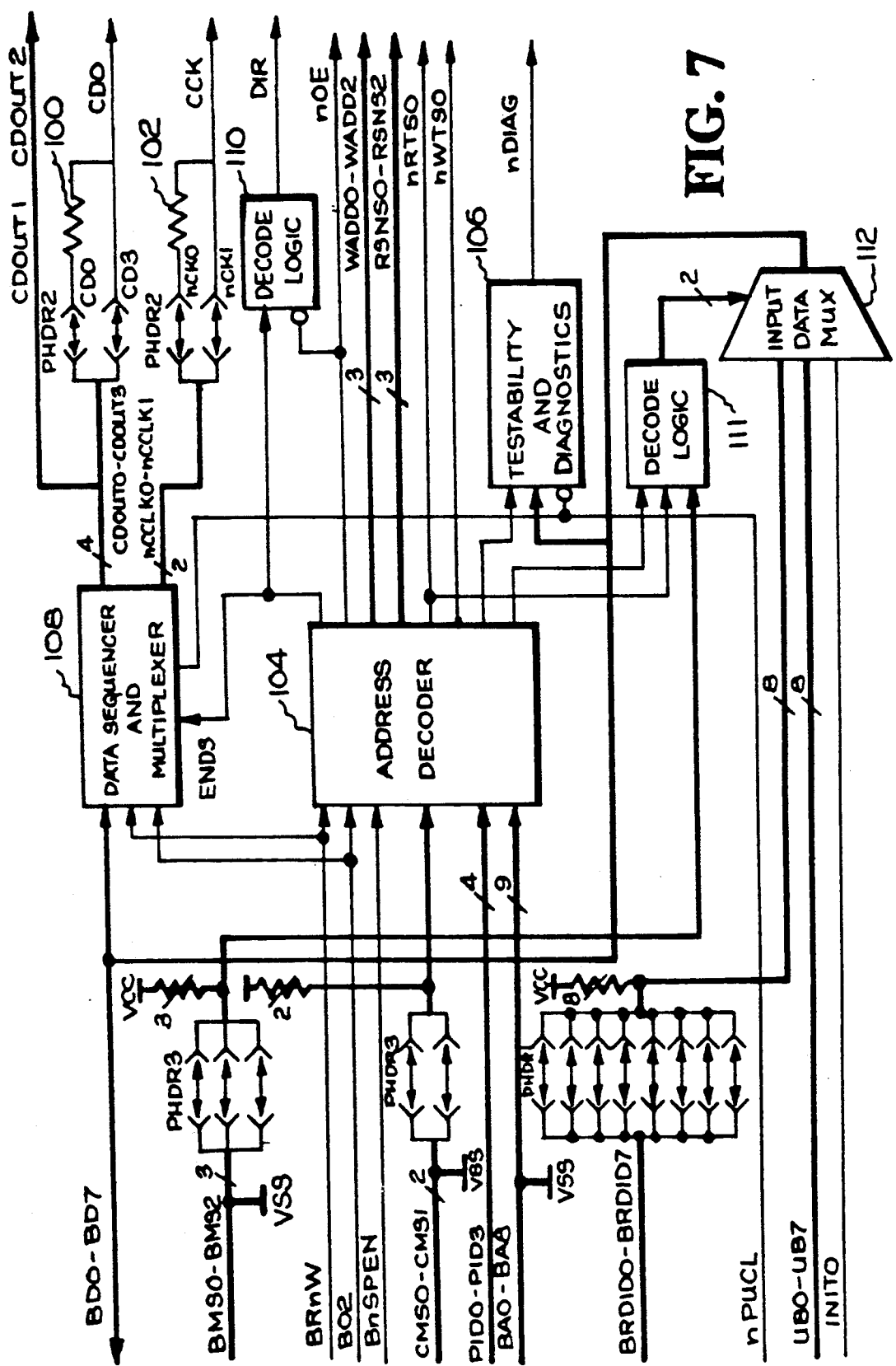
FIG. 7 is a block diagram of the system of circuits which handles the control and status signals and provides control over the operation of the circuits which transfer the data in the allotted time slots and as shown in FIGS. 4 and 5.

Referring to FIG. 7, there is shown the MPI 30 which is implemented in a programmable gate array. The MPI forms the address decoding and data sequencing operations in the interface. The programmable headers PHDR1 and PHDR3 provide codes on the BMS0-BMS2 the CMS0 and CMS1 and the board identification BRDID0-BRDID7 lines. The circuitry of the programmable headers is the same as shown at 56 and 58 in FIGS. 4 and 5. A number of resistors depending upon the number of links in the header applies the logic high level VCC while lines from VSS provide the logic low levels. The resistors and the lines are combined in FIG. 7 to simplify the illustration. There are also programmable headers PHRD2 which select CD0, CD3 and the nCK0 and nCK1 clock and command outputs CCK and CD0. One of these headers is connected to a resistor 100 to the output and the other through a similar resistor 102 to the output so as to prevent reverse currents when connections are made to both headers so that CD0 outputs correspond to the CDOUT0 and CDOUT3 command bites. Similarly, CCK will occur both on occurrence of the CCLK0 and CCLK1 clock pulses. These clock pulses are generated by the processor clock or the so-called Phase 2 clock as discussed in the above-referenced Gueldenpfennig and Breidenstein application.

The MPI has an address decoder 104 which is responsive to the BRnW line and the address lines BA0 to BA8 and the nSPEN address line as well as to the CMS0 and CMS1 and the port identification bits PID0-PID3. The processor clock outputs the read and write enables to the time slot register 44 (FIG. 4); and as well as provides the address (WADD) command (CD) and nOE signals. The address decoder 104 may also enable diagnostic circuits 106 which have registers which read data on the data bus lines. This register data may be used in the interface or in the user circuitry to identify the user circuitry and to test its operability. The testability and diagnostics registers 106 are optional.

The data is written into a data sequencer and multiplexer 108 when that unit is enabled by the address decoder on an enable input when BRnW is asserted. nOE also serves as a tri-state line to decode logic 110. During the write mode, nOE is low and is outputted to indicate that data can be transmitted on the data lines via the buffers 24 (FIG. 1) to the MSU switching system. DIR is a buffered version of RnW indicating which way the data is being carried on the databus BD0-BD7, which is a bi-directional bus. nOE serves to tri-state the buffers 24 when the interface and its associated user circuits are not being used thereby further isolating the data lines on the backplane from the user port circuits associated with the interface when they are not being used.

The data sequencer and multiplexer 108 controls the direction of the 8 bit bi-directional databus BD0-BD7 as well as the timing of the control signals and address signals presented to the user circuitry. The control data from the data lines is presented to the user circuitry on the CD lines in nibbles of 4 bits each; each nibble being clocked by one of the clocks CCLK0 and CCLK1. The address lines WADD0-WADD2 are decoded in the user circuitry. The command data from the sequencer is latched in latches in the sequencer 108. These latches are reset by the nPUCL pulse from the power monitor circuit 34 (FIG. 2).

Transmission to the MSU switching system address base is controlled by an input data multiplexer 112 which switches the board identification lines (BRDID0 to BRDID7) or the user status lines (UB0-UB7) or the INIT bit back onto the bi-directional databus (BD0-BD7) under decode logic 111 control. When the RnW line is high, the MSU reads data from the user's circuitry into the switching system.

From the foregoing description, it will be apparent that a highly flexible interface for PCM telephony systems has been provided. Variations and modifications in the herein described interface within the scope of the invention will undoubtedly suggest themselves to those skilled in the art. For example, the TSC & MPI can be implemented in a single gate array which has sufficient CMOS gates and pins for both purposes. Accordingly, the foregoing description should be taken as illustrative and not in a limiting sense.

We claim:

1. An interface system for a PCM telephony switching system which interfaces PCM data send and receive highways of said switching system with a port circuit having a send and a receive highway and which is selected to be of one of a plurality of different types of port circuits which is configured to provide different applications including connections for digital communication data signals representative of voice signals to N lines or trunks, where N may be different depending upon the type of port circuit, and to provide connections for said digital communication data signals, said interface system comprising means for transferring said data signals on one of said send highways of said switching system on which data propagates in successive time slots to the receive highway of said selected port circuit and from transferring said data signals on the send highway of said selected port circuit to another of said send highways of said witching system on which said data signals propagate in a sequential group of said time slots, means responsive to control signals from said switching system for controlling said transferring means, and manually programmable switch means for conditioning said control means and said transferring means by providing different connections corresponding to different ones of said applications and connected to said control means for enabling said transferring means to allot different numbers of time slots in different time relationships in accordance with the type of said selected port circuit and which includes said sequential group of said time slots.

2. The interface system according to claim 1 wherein said switching system has data lines carrying a plurality of said control signals and said control signal responsive means includes means for exchanging said control signals between said switching system data lines to said selected port circuit.

3. The interface system according to claim 1 wherein said transferring means includes means operated by said programmable switch means for selectively inverting alternate bits of the PCM data.

4. The interface system according to claim 2 wherein said means responsive to said control signals includes decoders for providing said control signals for said selected port circuit in response to signals on said switching system data lines, means for latching said control signals generated in said switching system, and said control signal responsive means also includes means for controlling the delivery of said control signals from said latching means to said selected port circuit.

5. The interface system according to claim 1 wherein said switching system has lines on which said control signals are carried, said means responsive to said control signals from said switching system includes means for transferring status signals generated in said selected port circuit to said lines which carry said status signals.

6. The interface system according to claim 4 wherein said transferring means includes registers for staring time slot identification control signals from said switching system, and means for resetting said latching means and said registers when operating power is applied to said interface system.

7. The interface system according to claim 1 further comprising at least one programmable gate array providing said transferring means and also said means responsive to said control signals.

8. The interface system according to claim 7 wherein said programmable gate array is separated into two interconnected gate arrays respectively providing said transferring means and said control signal responsive means.

9. The interface system according to claim 1 wherein said programmable switch means includes means for providing said connections to selectively generate different codes, and said transferring means includes means responsive to said different codes for selecting the period of time in which said time slots are allotted.

10. The interface system according to claim 1 wherein said manually programmable switch means has means for assigning a greater number of time slots when digital data signals are to be transferred than when voice data are to be transferred.

11. The interface system according to claim 1 wherein said manually programmable switch means provides outputs to said transferring means for selecting the number of time slots allocated to said selected port circuit, and said transferring means includes sequencing means for allocating said time slots to data which is received from and sent to said switching system receive and send highways, respectively.

* * * * *